United States Patent

Hammer

[11] Patent Number: 5,325,830
[45] Date of Patent: Jul. 5, 1994

[54] DEVICE FOR GOVERNING THE IDLING RPM OF AN INTEGRAL COMBUSTION ENGINE

[75] Inventor: Uwe Hammer, Schwieberdingen, Fed. Rep. of Germany

[73] Assignee: Robert Bosch GmbH, Stuttgart, Fed. Rep. of Germany

[21] Appl. No.: 71,820

[22] Filed: Jun. 7, 1993

[30] Foreign Application Priority Data

Sep. 18, 1992 [DE] Fed. Rep. of Germany ....... 4231239

[51] Int. Cl.$^5$ .................. F02M 23/04; F02D 9/02
[52] U.S. Cl. .................. 123/339; 251/129.02; 137/627.5
[58] Field of Search .................. 123/339; 251/129.02, 251/129.04, 129.08; 137/627.5

[56] References Cited

U.S. PATENT DOCUMENTS

| | | | |
|---|---|---|---|
| 3,325,139 | 6/1967 | Diener et al. | 251/129.02 |
| 4,052,996 | 10/1977 | Burrus | 137/627.5 |
| 4,561,464 | 12/1985 | Frantz | 137/627.5 |
| 4,573,659 | 3/1986 | Homes | 251/129.02 |
| 4,711,269 | 12/1987 | Sule | 251/129.02 |
| 4,756,286 | 7/1988 | Wietschorke et al. | 123/339 |
| 4,989,564 | 2/1991 | Cook et al. | 123/339 |
| 5,042,448 | 8/1991 | Cook et al. | 123/339 |
| 5,070,838 | 12/1991 | McKay | 123/339 |
| 5,090,381 | 2/1992 | Tanabe | 123/339 |
| 5,188,073 | 2/1993 | Ejiri et al. | 123/339 |

FOREIGN PATENT DOCUMENTS 0153962 7/1988 European Pat. Off. .

Primary Examiner—E. Rollins Cross
Assistant Examiner—Thomas N. Moulis
Attorney, Agent, or Firm—Edwin E. Greigg; Ronald E. Greigg

[57] ABSTRACT

A device for governing the idling rpm of an internal combustion engine which prevents a leakage. A closing element is axially and radially displaceable by a second spring and maintained to be angularly movable on the valve element and/or the regulator housing. Frustoconical surfaces are advantageously embodied on the closing element, the regulator housing and the valve element, so that the closing element can be centered on the conical seats. The springs are disposed parallel to each other, and the closing element is acted upon by a spring force in the closing direction and the valve element is acted upon by a spring force in the opening direction. The device is particularly suited for governing the idling rpm of a mixture-compressing, spark-ignition internal combustion engine by means of controlling the quantity of aspirated air flowing in a flow line to the engine.

6 Claims, 1 Drawing Sheet

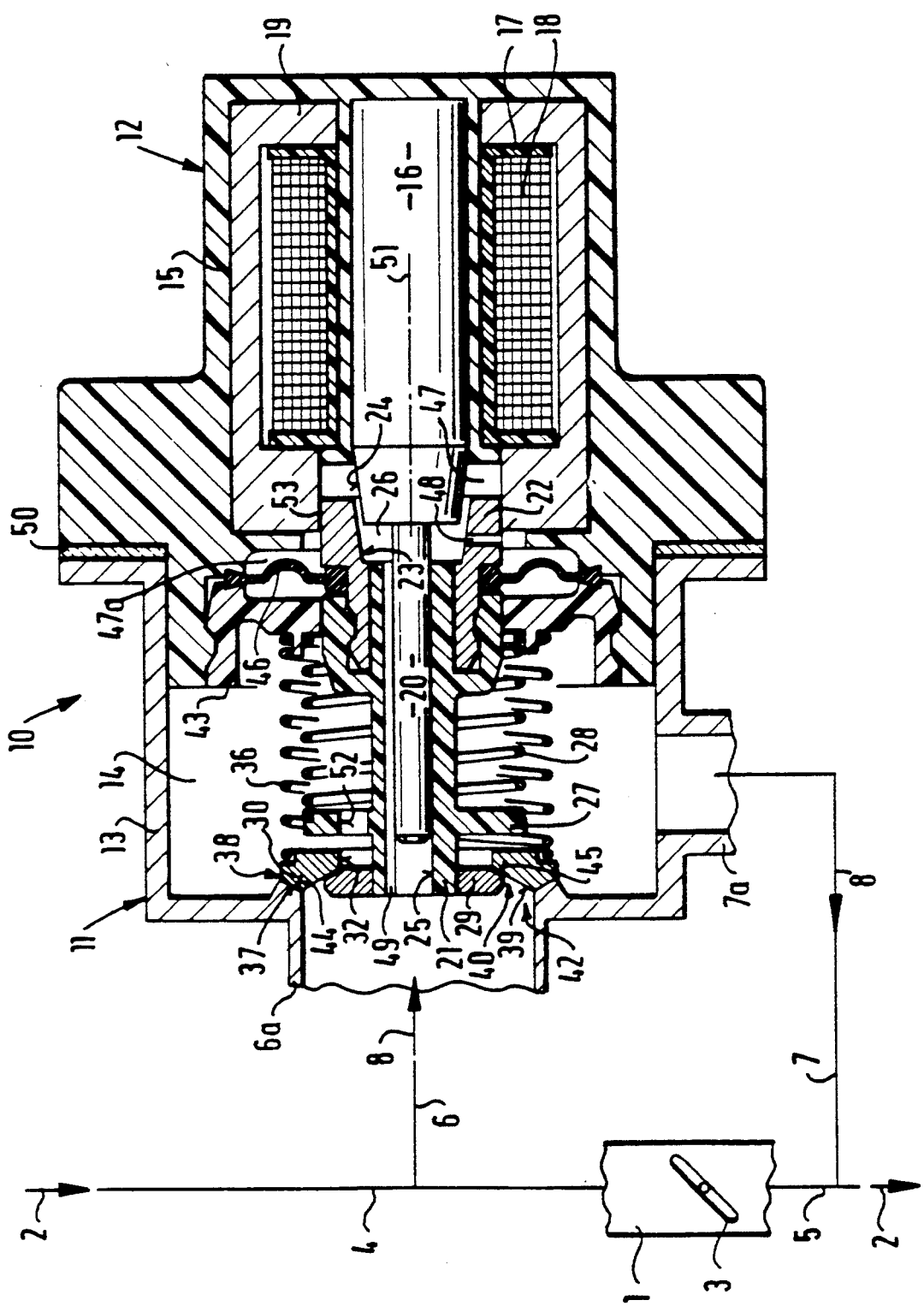

5,325,830

DEVICE FOR GOVERNING THE IDLING RPM OF AN INTEGRAL COMBUSTION ENGINE

RELATED APPLICATION

This application is related to another application, identical inventor and assignee, further identified by Ser. No. 08/072,014 filed Jun. 7, 1993.

BACKGROUND OF THE INVENTION

The invention is based on a device for governing the idling rpm of an internal combustion engine as defined hereinafter. A device of this type is already known (European Patent 0 153 962 B1), in which an undesired leakage flow can occur due to manufacturing or assembly misalignments in flow lines, the closing element and valve element.

In addition, in the known device, the springs that act upon the closing element and the valve element are disposed such that their spring forces are partially mutually compensating, because of which the regulating properties of the device are negatively affected. A particular disadvantage in this case is that the closing position of the valve element and the opening position of the closing element coincide, which counteracts a stable closed state of the device, particularly during vibration excitation. To assure a stable closed state of the closing element, a spring force as large as possible that acts on the closing element is required, the effect of which is that, on the other hand, a correspondingly strong spring force is necessary to open the valve element, because of the driving capacity necessary for operating the device increases.

OBJECT AND SUMMARY OF THE INVENTION

In contrast, the device in accordance with the invention for governing the idling rpm of an internal combustion engine has the advantage that the closing element can be centered in a simple manner, depending on the embodiment of the conical seats between the closing element and the regulator housing or the regulating element and the valve element, and an undesired leakage flow can be prevented.

Moreover, the arrangement of springs improves additional regulating properties of the device in accordance with the invention. For example, the dependability of the device if the driving element should break down is increased by means of the action of a spring force on the closing element in the closing direction and on the valve element in the opening direction. The actions of spring forces on the closing element and the valve element occur independently of each other, so that the device in accordance with the invention assumes a stable closed state in the closing position of the closing element and the valve element.

The arrangement of an adjusting body between the drive housing and regulator housing is particularly advantageous; by means of this, the prestressing force of the springs that act upon the closing element and the adjusting element can be varied in a simple manner. If the regulator housing of the device is formed by a wall of the flow line, the required amount of parts can be decreased.

The invention will be better understood and further objects and advantages thereof will become more apparent from the ensuing detailed description of preferred embodiments taken in conjunction with the drawing.

BRIEF DESCRIPTION OF THE DRAWING

The single FIGURE of the drawing shows an exemplary embodiment of the invention, which will be explained in more detail in the following description.

DESCRIPTION OF THE PREFERRED EMBODIMENT

In the drawing, a flow line is indicated by 1 in which an operating means, particularly intake air, can flow in the direction of the arrows 2 to a mixture-compression, spark-ignition internal combustion engine, not shown in closer detail. The flow cross-section of the flow line 1 can be controlled via a throttle valve 3, so that more or less of the operating fluid flows to the engine, depending on the position of the angle of rotation of the throttle valve. An area 4 of the flow line 1 located upstream of the throttle valve 3 communicates with an area 5 of the flow line 1 located downstream of the throttle valve 3 via connecting lines 6, 7. The quantity of operating fluid circulating in the connecting lines 6, 7 that bypasses the throttle valve 3 in the direction of the arrow 8 can be controlled via a device 10 in accordance with the invention that is disposed between the connecting line 6 and the connecting line 7.

The device 10 is essentially divided into a regulating element 11 and a driving element 12. The regulating element 11 has a regulator housing 13, which encloses a regulating chamber 14 and can either be formed in one piece by the wall of the flow line 1 or be embodied as a separate element. If the regulator housing 13 is formed by the wall of the flow line 1, the connecting lines 6, 7 discharge directly into the regulating chamber 14. If the regulator housing 13 is embodied as a separate element, then the connection lines 6, 7 are connected to connectors 6a, 7a on the regulator housing 13.

The driving element 12 has a drive housing 15, made of plastic, for example, in which an induction core 16, a coil 18 that is mounted on a coil body 17 and concentrically surrounds the induction core 16, and a ferromagnetic annular body 19 are fixed, by means of extrusion, for example. The coil 18 can be charged with a voltage that is a function of the rpm of the internal combustion engine, so that a magnetic field whose strength corresponds to the state of excitation of the coil 18 can be formed in a known way between elements 16, 18 and 19.

An axle journal 20 that extends in the axial direction is embodied concentrically on the face end of the induction core 16 facing the regulating element 11. An adjusting element 21, such as a sliding sleeve made of plastic, is disposed to be axially displaceable on the axle journal 20, and the axle journal 20 is at least partially disposed in a bearing opening 25 embodied in the adjusting element 21. The adjusting element 21 is connected on its side facing the induction core 16 to an annular, ferromagnetic armature 22. The induction core 16 protrudes partly into an annular opening 26 disposed in the armature 22 and has an outer surface 24 shaped like the envelope of a cone, which corresponds to an inner surface 23 shaped like the envelope of a cone that is embodied on the armature 22. A shoulder 27 embodied on the adjusting element 21 is oriented radially outward and is engaged by a first spring 28 that acts upon the adjusting element 21 with a return force counter to the attraction force of the driving element 12, so that a more or less large overlap is created between the armature 22 and the induction core 16, depending on the state of excitation of the coil 18.

A valve body 29 is secured, for instance forced on by pressure, to the end of the adjusting element 21 remote from the induction core 16; it is disposed, along with a closing element 30, at the discharge opening of the connecting line 6 or the connecting branch 6a into the regulating chamber 14. The annular closing element 30 has a through opening 32 through which an area of the adjustment element 21 between the shoulder 27 and the valve element 29 protrudes with a great deal of play, and is acted upon by a second spring 36 with a spring force counter to the direction of flow. A first frustoconical surface 37 is embodied at the closing element 30 that, with a first corresponding surface 44 disposed on the wall of the regulator housing 13, forms a first conical seat 38, against which the closing element 30 is kept pressed by the second spring 36. The first conical seat 38 includes, with a longitudinal axis 51 of the device 10, a sufficiently acute angle because of the axial and radial mobility and angular mobility of the second spring 36 that the closing element 30 centers on the first conical seat 38, preventing the operating fluid from flowing between the wall of the regulator housing 13 and the closing element 30 into the regulating chamber 14.

The closing element 30 has a second frustoconical surface 39 that, with a second corresponding surface 45 embodied on the valve member 29, forms a second conical seat 40 against which the valve member 29 is held, when the coil 18 is excited, by the magnetic attraction force of the driving element 12, minus the force of the first spring 28, so that, when the conical seat 40 is closed, no operating fluid can flow between the closing element 30 and the valve member 29 into the regulating chamber 14. The second frustoconical surface 39 extends, seen in the radial direction, closer to the longitudinal axis 51 and is advantageously inclined toward the driving element 12.

In the state of excitation of the coil 18 represented in the drawing, the closing element 30 blocks a flow opening 42 located between the valve member 29 and the wall of the flow line 6 or the connector 6a. By means of an increase in the excitation of the coil 18 and the associated increase in the magnetic attraction force of the driving element 12, the valve member 29 can be displaced counter to the force of the springs 28, 36 in the direction of flow, with the consequence that the closing element 30 is lifted from the first conical seat 38 and the operating fluid can flow between the closing element 30 and the wall of the connecting line 6 or the connector 6a into the regulating chamber 14 and, from there, flows via the connecting line 7 to the internal combustion engine. With the closing element 30 lifted from the first conical seat 38, the closing element 30 is held at the second conical seat 40 by the force of the second spring 36. The second conical seat 40 likewise forms a sufficiently acute angle with the longitudinal axis 51 of the device that the closing element 30 is centered on the second conical seat 40.

If, starting from the described open position, the excitation of the coil 18 and the magnetic attraction force of the driving element 12 should now diminish, the valve member 29 is displaced counter to the direction of flow of the connecting line 6 until the closing element 30 rests sealingly against the first conical seat 38. If the excitation decreases further, the valve member 29 is lifted from the second conical seat 40 with the first conical seat 38 closed, until the shoulder 27 touches the closing element 30. At least one emergency air opening 52 that extends axially is embodied in the shoulder 27; the operating fluid flows through it via the open conical seat 40 into the regulating chamber 14 when the coil 18 is not excited, and the quantity of operating fluid can be defined by means of the width of the gap between the valve member 29 and the closing element 30 or by means of the size of the emergency air opening 52 or the through opening 32.

All in all, the following three positions of the valve member 29 of the device 10 in accordance with the invention can be distinguished: a base position with a closed first conical seat 38 and opened second conical seat 40 when the coil 18 is not acted upon; a closing position with a closed first conical seat 38 and closed second conical seat 40; and an open position with an opened first conical seat 38 and closed second conical seat when the coil 18 is relatively strongly excited.

In the base position of the device 10, it is assured that a quantity of operating fluid that maintains the operation of the engine can pass through the regulating chamber 14, even when, for example, the control signal that acts upon the coil 18 fails, while in the closing position shown in the drawing, the operating fluid is prevented from flowing around the throttle valve 3. In the open position of the device 10, with the closing element 30 lifted from the regulator housing 13, the quantity of operating fluid flowing through the regulating chamber 14 corresponds to a gap width that is established between the closing element 30 and the regulator housing 13, depending on the state of excitation of the coil 18. Given appropriate excitation of the coil 18, the valve member 29 and/or the closing element 30 assume intermediate positions. By means of an advantageous selection of spring constants or the pre-stressing of the springs 28, 36, the regulating characteristics of the device 10 can be varied as desired.

In the device 10 in accordance with the invention, the springs 28, 36 that act upon the adjusting element 21 and the closing element 30 are disposed to be parallel, so that their spring forces are added together upon a corresponding deflection of the adjusting element 21. Both springs 28, 36 are supported against a lid 43 that is fixedly attached to the drive house 15, defines the regulating chamber 14 in the axial direction toward the driving element 12 and concentrically encloses the adjusting element 21 with play. The arrangement of the springs 28, 36 has the effect that the closing position of the device 10 not only is established during a defined state of excitation of the coil 18; instead, the closing position extends over a range of excitation in which, despite an increase in the excitation voltage, the device 10 does not open, because in order to lift the closing element 30 from the first conical seat 38, the force of the second spring 36 must additionally be overcome. The size of the closed area can be advantageously varied in the process by means of an appropriate selection of spring constants or the pre-stressing of the first spring 28 and/or the second spring 36, so that an adaptation to the properties of a control device that acts on the device 10, for example, can be effected. Greater pre-stressing of the second spring 36 and lesser prestressing of the first spring 28 can have the effect that the range of excitation, in which the device 10 occupies a closing position, is enlarged, reducing the requirements for precision for triggering, and reduces the susceptibility of the device 10 to vibrate in the closing position.

An equalization chamber 47 is embodied inside the driving element 12 that communicates with the connecting line 6 via a connection 49 embodied in the regulating element 21 such that an equalization in pressure is effected between the connecting line 6 and the equalization chamber 47. The equalization chamber 47 is enclosed by the induction core 16 with the axle journal 20, the armature 22, the annular body 19 and the drive housing 15. An area 47a of the equalization chamber 47 can likewise be acted upon by the pressure of the connecting line 6 via an equalization opening 48 embodied in or on the armature 22, for example, and/or an annular gap 53 located between the armature 22 and the annular body 19. In the process, the area 47a of the equalization chamber 47 is defined by an elastic diaphragm 46 in the direction of the lid 43. With the aid of the equalization chamber 47, the pressure of the operating fluid acting on the adjusting element 21 in the direction of flow in the connecting line 6 can be compensated to a small extent, so that the regulating force needed to adjust the valve member 29 is somewhat independent of the pressure of the operating fluid present in the connecting line 6.

At least one adjusting body 50, by means of whose axial thickness the axial distance between the regulating element 11 and the driving element 12 is determined, is disposed between the regulator housing 13 and the drive housing 15. Depending on the axial thickness of the adjusting element 50, the axial distance between the lid 43 and the shoulder 27 and between the lid 43 and the closing element 30 (in the base position of the device 10, for example) shortens or lengthens, so that the prestressing of the springs 28, 36 can be influenced in a simple manner via the thickness of the adjusting element 50.

The foregoing relates to a preferred exemplary embodiment of the invention, it being understood that other variants and embodiments thereof are possible within the spirit and scope of the invention, the latter being defined by the appended claims.

WHAT IS CLAIMED AND DESIRED TO BE SECURED BY LETTERS PATENT OF THE UNITED STATES IS:

1. A device for governing the idling rpm of an internal combustion engine by controlling a quantity of operating fluid that flows in a flow line to the engine, having an electromagnetic regulating drive (22) disposed in a drive housing (15) that is activated by a speed-dependent control signal, a regulator housing (13) and an adjusting element (21) coupled to the regulating drive, said adjusting element is engaged by a first spring (36) and at whose end remote from the regulating drive, a valve element (29) is disposed, by means of which a closing element (30) engaged by a second spring (28) is displaceable from a closing position into an opening position when the regulating drive is activated, and the valve element assumes an open position when the regulating drive is not activated and a closed position during increasing activation, the closing element (30) has a first frustoconical surface (37) that rests against a first corresponding surface (44) embodied on the regulator housing (13) in the closed position of the closing element (30) and, with this surface, forms a first conical seat (38), and has a second frustoconical surface (39) that rests against a second corresponding surface (45) embodied on the valve element (29) in the open position of the closing element (30) and, with this surface, forms a second conical seat (40), and that the first and second springs (28, 36) are disposed parallel to each other such that when the valve element (29) is adjusted into the open position or the closed position, only the force of the first spring (28) is effective.

2. The device as defined by claim 1, in which the second spring (36) surrounds the first spring (28) and that the force of the first spring (28) and the force of the second spring (36) are effective when the closing element (30) is adjusted into the opening position or the closing position.

3. The device as defined by claim 1, in which one of the ends of springs (28, 36) is supported by the drive housing (15), that the drive housing (15) is attached to the regulator housing (13) and that at least one adjusting body (50) that affects the prestressing force of the springs (28, 36) is inserted between the drive housing (15) and the regulator housing (13).

4. The device as defined by claim 2, in which one of the ends of springs (28, 36) is supported by the drive housing (15), that the drive housing (15) is attached to the regulator housing (13) and that at least one adjusting body (50) that affects the prestressing force of the springs (28, 36) is inserted between the drive housing (15) and the regulator housing (13).

5. The device as defined by claim 3, in which the regulator housing (13) is formed by a wall of a flow line (8).

6. The device as defined by claim 4, in which the regulator housing (13) is formed by a wall of a flow line (8).

* * * * *